(12) United States Patent
Deiss

(10) Patent No.: US 7,996,871 B2
(45) Date of Patent: Aug. 9, 2011

(54) METHOD AND APPARATUS FOR USING METADATA FOR TRICK PLAY MODE

(75) Inventor: Michael Scott Deiss, Zionsville, IN (US)

(73) Assignee: Thomson Licensing, Boulougne-Billancourt (FR)

( * ) Notice: Subject to any disclaimer, the term of this patent is extended or adjusted under 35 U.S.C. 154(b) by 460 days.

(21) Appl. No.: 11/662,415

(22) PCT Filed: Sep. 23, 2005

(86) PCT No.: PCT/US2005/034196
§ 371 (c)(1),
(2), (4) Date: Mar. 9, 2007

(87) PCT Pub. No.: WO2006/034464
PCT Pub. Date: Mar. 30, 2006

(65) Prior Publication Data
US 2008/0120637 A1    May 22, 2008

Related U.S. Application Data

(60) Provisional application No. 60/612,624, filed on Sep. 23, 2004.

(51) Int. Cl.
*H04N 7/173* (2011.01)
(52) U.S. Cl. .............................. 725/88; 725/90; 386/340
(58) Field of Classification Search ............... 725/88–90
See application file for complete search history.

(56) References Cited

U.S. PATENT DOCUMENTS

| | | | |
|---|---|---|---|
| 6,065,050 A | 5/2000 | DeMoney | |
| 6,445,738 B1 | 9/2002 | Zdepski et al. | |
| 6,510,554 B1 | 1/2003 | Gordon | |
| 6,804,450 B1 | 10/2004 | Kochale | |
| 6,823,131 B2 | 11/2004 | Abelard et al. | |
| 6,847,780 B2 | 1/2005 | Gunatilake | |
| 6,856,997 B2 | 2/2005 | Lee et al. | |
| 6,871,006 B1 | 3/2005 | Oguz et al. | |
| 7,610,605 B2 | 10/2009 | Negishi et al. | |
| 2003/0093801 A1 | 5/2003 | Lin et al. | |

(Continued)

FOREIGN PATENT DOCUMENTS

EP    0712127    5/1996

(Continued)

OTHER PUBLICATIONS

WO 02/15579.*

(Continued)

*Primary Examiner* — Andrew Y Koenig
*Assistant Examiner* — Anthony Bantamoi
(74) *Attorney, Agent, or Firm* — Robert D. Shedd; Vincent E. Duffy; Joel M. Fogelson

(57) ABSTRACT

A video receiver system is conditioned for extracting trick play metadata, corresponding to video information, from a received transport stream. The video receiver system identifies the presence of such metadata in response to information present in the header of a transport packet. The video receiver after extracting metadata stores data corresponding to such metadata in a table (175). When implementing a trick play function during video playback, video receiver system (20) uses the data in the table to implement a desired trick play function. Inserting metadata in transport stream using transport priority bit or payload or transport packets.

9 Claims, 2 Drawing Sheets

U.S. PATENT DOCUMENTS

| | | |
|---|---|---|
| 2003/0118322 A1* | 6/2003 | Kim ............................... 386/83 |
| 2003/0123657 A1* | 7/2003 | Bjordammen et al. ......... 380/42 |
| 2003/0123849 A1 | 7/2003 | Nallur et al. |
| 2003/0169815 A1* | 9/2003 | Aggarwal et al. ........ 375/240.12 |
| 2003/0182662 A1* | 9/2003 | Nishio et al. .................... 725/95 |
| 2003/0199246 A1* | 10/2003 | Friedman et al. ............ 455/3.01 |
| 2003/0226150 A1 | 12/2003 | Berberet et al. |
| 2004/0001693 A1 | 1/2004 | Cavallerano et al. |
| 2004/0022313 A1 | 2/2004 | Kim |
| 2004/0028386 A1 | 2/2004 | Walls et al. |
| 2004/0267952 A1 | 12/2004 | He et al. |
| 2005/0022245 A1 | 1/2005 | Nallur et al. |
| 2005/0262529 A1* | 11/2005 | Neogi et al. .................... 725/31 |
| 2006/0037057 A1* | 2/2006 | Xu .................................. 725/90 |

FOREIGN PATENT DOCUMENTS

| | | |
|---|---|---|
| EP | 1150497 | 10/2001 |
| EP | 1324610 | 7/2003 |
| EP | 1445914 | 8/2004 |
| JP | 2001-359072 A | 12/2001 |
| JP | 2002-325230 A | 11/2002 |
| JP | 2003-264804 A | 9/2003 |
| JP | 2003-299047 A | 10/2003 |
| WO | WO0135669 | 5/2001 |
| WO | WO0215579 | 2/2002 |

OTHER PUBLICATIONS

ATSC Digital Television Standard Doc. A/53, published Apr. 12, 1995, p. 41, section 5.6.3.*

Advanced Television Systems Committee: "Guide to the Use of the ATSC Digital Television Standard", No. A/54, Oct. 4, 1995, pp. 1-148, XP002255337.

Doh, Sang-Yoon et al.:"Fast Foward and Fast Rewind Play System Based on the MPEG System Stream with New Concept." vol. 2, Jun. 7, 1999, pp. 846-850, XP010519500.

* cited by examiner

METHOD AND APPARATUS FOR USING METADATA FOR TRICK PLAY MODE

CROSS-REFERENCE TO RELATED APPLICATIONS

This application claims the benefit, under 35 U.S.C. §365 of International Application PCT/US2005/034196, filed Sep. 23, 2005, which was published in accordance with PCT Article 21(2) on Mar. 30, 2006 in English and which claims the benefit of U.S. provisional patent application No. 60/612,624, filed Sep. 23, 2004.

FIELD OF THE INVENTION

The present invention generally relates to digital transmission systems, more particularly to video transmission systems that support trick play functions.

BACKGROUND OF THE INVENTION

When transmitting a video program via a digital delivery system such as cable, satellite, over the airwaves, through the Internet, and the like, the video program is delivered as a series of data packets which are eventually decoded by a video receiver. Currently, video delivery systems utilizing either satellite or over the air transmissions are typically known as being a "one way" transmission, where a majority of video information is transmitted from a program broadcaster to a video receiver (in the form of a device such as a set top box or television set). If a receiving device however does support a back channel, the amount of information that is capable of being transmitted back to a broadcaster (upstream) is typically less than what is transmitted from the broadcaster to the receiving device (downstream).

When delivering video content however through a satellite transmission or an over the air broadcast, such delivery systems do not support trick play functions such as fast forwarding, reverse, pause, skipping ahead/behind a specified amount of time because there is no way for a broadcaster support such features when broadcasting video to a large number of video receivers. Specifically, if each user operating a video receiver were to desire a different trick play function at the same time, there would be no way for a broadcaster to efficiently support all of those functions because of the limitations on the broadcast bandwidth available to a broadcaster.

SUMMARY OF THE INVENTION

According to an aspect of the present invention, there is provided an apparatus and method for broadcasting data packets that contain information related to supporting a trick play function in a video receiver.

According to yet another embodiment of the present invention, an apparatus and method are provided for supporting a video trick function in a video receiver, utilizing information that is transmitted as part of a transmission from a broadcaster.

These and other aspects, features and advantages of the present invention will become apparent from the following detailed description of preferred embodiments, which is to be read in connection with the accompanying drawings.

DETAILED DESCRIPTION OF THE INVENTION

The present invention is directed towards supporting a video trick play function in a video playback device, such as a computer, set top box, television set, and the like, using information that is transmitted as part of a packetized data signal from a source such as a satellite provider such as DIRECTV, over the air television broadcast, cable company, streaming media provider, Video over Internet Protocol transmission, and the like. The exemplary embodiments of the present invention are described in regards to using a data transport structure that is used by a provider such as a satellite provider such as DIRECTV or a data transport structure that is compliant with the ATSC high definition standard (see ATSC 53/A standard, published on Oct. 4, 1995). It is to be understood that these described modalities are not limiting, and one of the ordinary skill in the art would be able to apply the principles of the present invention to other transmission methodologies and transport structures.

It is also to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
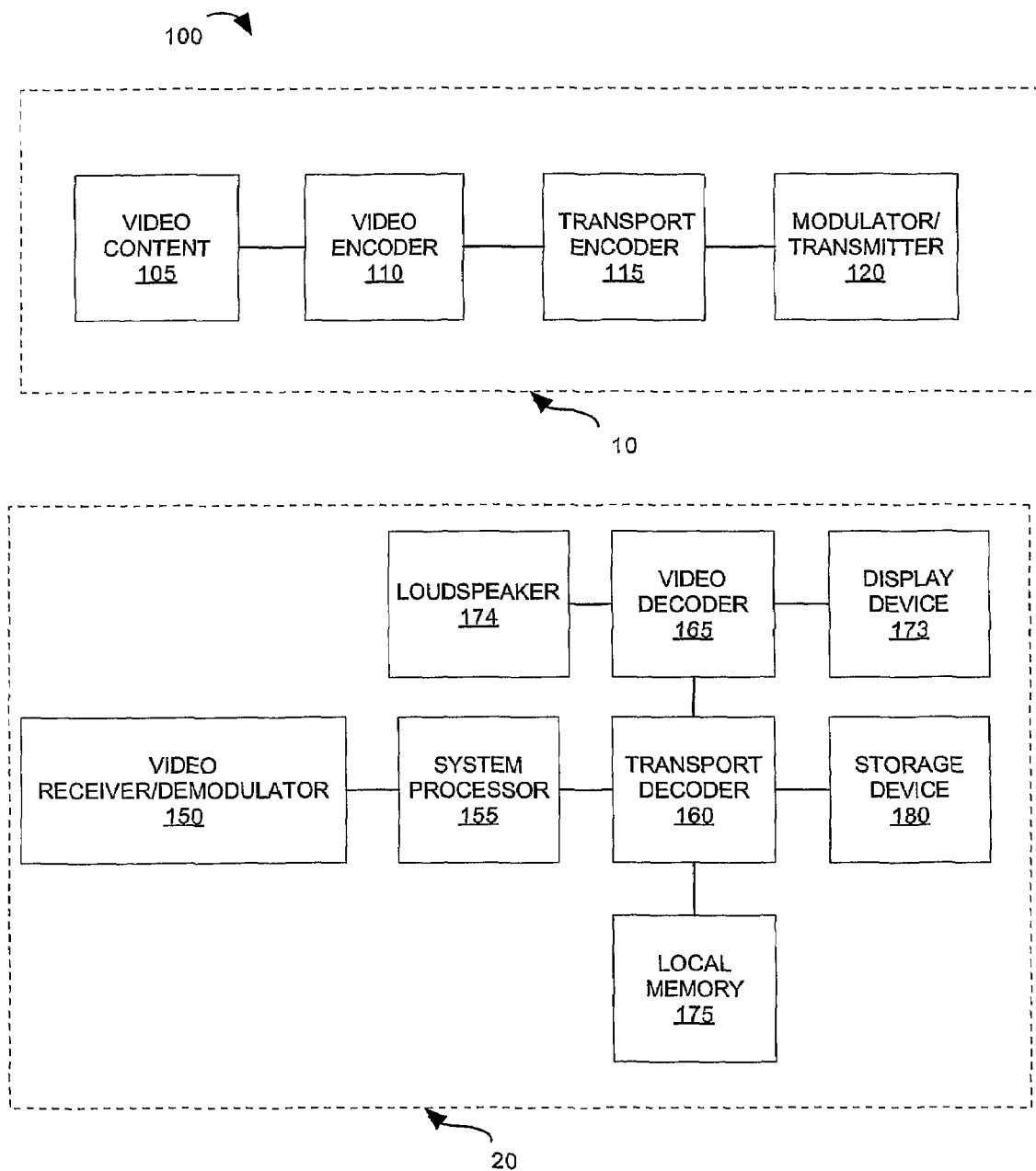
FIG. 1 is a diagram illustrating an exemplary embodiment of a video signal transmitter system and video signal transmitter receiver system.

FIG. 1 presents a high level view of a video broadcast and video receiver system 100 that is to be used in accordance with an embodiment of the present invention. Video broadcast system 10 presents video content 105 that provides the video that is to be transmitted by the video broadcast system. Preferably, video content 105 is video (and optionally audio information) that is stored on a mass storage device (such as DVD, videotape, hard drive), is provided from a real time broadcast source such as a video camera, or from a data network that is capable of transmitting video information.

The video information from video content 105 is encoded as digital information by video encoder 110, preferably using a video compression standard such as MPEG-2, H.261, H.264, and the like. In the case of ATSC, MPEG-2 is used to compress video information into Independent Frames (I Frames), Bi-Directional Frames (B Frames), and Predictive Frames (P Frames). Other types of video compression may be used to compress the video data from video encoder 110 into a compressed video data signal. It is noted the operation of compressing video by video encoder 110 are optional, and may not be used for a particular broadcast. For example, a broadcaster may decide to transmit a video signal as a series of uncompressed I frames or other type of uncompressed video information.

The encoded video signal from video encoder 110 is provided to video transport encoder 115 that encodes the video signal into a packetized data signal formed of a number of data transport packets (transport stream). In an embodiment of the present invention, the video encoded signal from video encoder 110 is encoded into a transport stream composed of transport packets as described in the ATSC 53/A standard and shown in FIG. 2. Typically, a transport stream is used to transmit video, audio, or auxiliary information, where each transport stream is associated with a particular packet identification number or PID. It is noted that other types of transport packets schema may be used, such as Transport Control Protocol (TCP), User Data Protocol (UDP) and the like.

Figure 2:
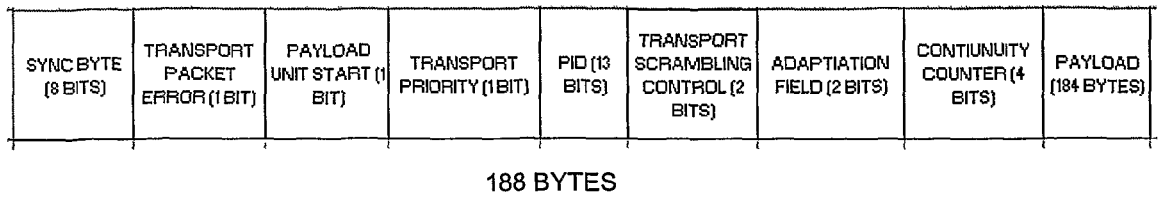
FIG. 2 is a diagram illustrating an exemplary embodiment of a transport packet.

Specifically, the transport packet of FIG. 2 represents a one hundred and eighty-eight byte data packet with a four byte header. The first eight bits of the header represent a sync byte. The second part of the data packet is a single bit value that is a transport packet error flag. The next part of the transport packet represents a payload unit start indicator flag that is a single bit value. A transport priority flag is the next segment of the transport consisting of a one bit value that indicates if a transport packet is assigned a high or low priority. It is noted that this transport priority flag is typically not used for a video program broadcast for an ATSC based video transmission.

The next thirteen bits are reserved for PID information that identifies the transport stream in which a specific transport packet belongs to. The next two bits of the transport header represent a transport scrambling control (indicating whether a packet payload is scrambled), with following two bits indicating an adaptation field control (disclosing whether an adaptation header is preset and if it is accompanied by a payload in the same transport packet). The last four bits of the header represents a continuity counter that is typically increased monotonically. The continuity counter may be used to indicate the order of received transport data packets and whether a transport data packet is missing.

The other one hundred and eight four bits of a transport packet is the payload of the packet representing audio data, video data, auxiliary data, or a mixture of all three types of data. The contents of the payload are typically defined in accordance with the requirements of a broadcaster.

Referring back to the video broadcast system 10 displayed in FIG. 1, the processed transport stream is provided from video transport encoder 115 to video modulator/transmitter 120 that modulates the video transport stream into a signal that is capable of being transmitted. The modulated signal may be modulated using a technique such as quadrature amplitude modulation (QAM), quadrature phase shift keying (QPSK), vestigial side band (VSB), and the like that are used for transmitting a video signal over a specified modality such as a satellite, over the airwaves, cable, modem, and the like. Optionally, the video transport stream is encoded for transmission using a format such as trellis encoding, Reed Solomon encoding, and the like.

Video receiver system 20 (hereafter receiver system 20) represents a video demodulation/decoder system that is capable of processing the data signal transmitted by video broadcast system 10 into a video signal that is capable of being played back and displayed on a display device. Video receiver/demodulator 150 represents circuitry that receives (via an antenna, satellite dish, network interface connection, and the like) the data signal transmitted from video broadcast system 10 and processes the data signal into a data transport stream for further operations. Preferably, video receiver/demodulator 150 performs operations that are the inverse of what were performed by modulator/transmitter 120 to transmit a data signal. For example, if a trellis encoded data signal was modulated using QAM, video receiver/demodulator 150 would demodulate the received data signal using a QAM based demodulation and trellis decoding technique into a transport stream from a link layer subsystem. It is to be appreciated that different demodulation and decoding techniques are to be selected based upon the requirements of receiver system 20.

Transport decoder 160 receives the decoded transport stream from video receiver demodulator 150, and processes the received transport packets into encoded video information and information representing trick play data. As to be explained later in the text of the application, transport decoder 160 reads information embedded in the transport packet header or payload to assist receiver system 20 with a trick play function. Examples of the information extracted by transport decoder 160 as described later in the text of this specification.

Video decoder 165 receives the processed data from video transport decoder 160. Preferably, video decoder 165 takes the processed data and decoded such data into video information that is capable of being displayed on display device 173 (representing a television, monitor, and the like). The video decoding operation performed by video decoder 165 is the inverse operation performed by video encoder 110. For example, if the processed data is encoded as MPEG-2 video, the video decoder 165 would decode the MPEG-2 video into a video signal that is capable of being displayed on display device 173. The decoding operation performed by video decoder 165 depends on the encoding scheme used to encode video data. Optionally, video decoder 165 also decodes audio information from the processed data that is received from transport decoder 160. This decoded audio information is capable of being outputted to loud speaker 174 by video decoder 165 as sound.

Local memory 175, coupled to transport decoder 160, is used to store information that is extracted from received transport packets to support a trick play function by receiver system 20. This information may be a table of metadata that is formed from the information that is extracted from transport packets by transport decoder 160, as to be described later in this specification.

Storage device 180 is conditioned to store transport streams received from transport decoder 160, decoded transport streams received from transport decoder 160, and decoded video data received from video decoder 165. Preferably, Storage device 180 is a storage device such as a hard drive, random access memory, flash card, digital versatile disc, tape system, and the like. Aside for storing video data and transport streams, storage device 180 is conditioned to support trick play functions such as such as fast forward, rewind, pause, skip ahead, skip backwards, and the like.

System processor 155 is a microprocessor used by receiver system 20 to control the components of receiver system 20 described above. In an optional embodiment of the present invention, system processor 165 is combined with transport decoder 160.

When transmitting a digital signal as a series of data transport packets, transmitting system 10 and receiver system 20 are capable of supporting trick play functions by using particular sections of such data transport packets to indicate information about the video data being delivered in such data transport packets. This data representing trick play metadata is inserted into a transport packet (header, payload, or both) by transport encoder 115. Likewise, when digital data is processed by receiver system 20, transport decoder 160 is configured to extract such trick play metadata from a transport packet where such metadata may reside.

This extracted metadata is then used by receiver system 20 to form a table of metadata that correlates trick play metadata and the video information that is being delivered to and processed by receiver system 20. For example, TABLE 1 represents an exemplary embodiment of a table of trick play metadata that is used to support a trick function. In the present example, TABLE 1 indicates the time position information of I frames that are received in a packetized data transport stream, where the time positions are stored as table entries, although other trick play related information may be stored in the table.

TABLE I

| FRAME TYPE | TIME POSITION (seconds) |
|---|---|
| I | 1.27 |
| I | 2.54 |
| I | 3.71 |
| I | 4.11 |
| I | 5.25 |
| I | 6.11 |

The values that are used to create the table containing trick play metadata are preferably stored in local memory 175 by transport decoder 160. In addition, storage device 180 may be optionally used to store data representing the transport stream, encoded video information, or decoded video information that is accessed by system processor 155 to engage a trick play function.

According to an embodiment of the invention, a transport stream, when received by receiver system 20, is processed to create the contents in TABLE 1, (as stored in local memory 175) and contents of the video data of the transport stream is stored as encoded video in storage device 180, as described above. When receiver system 20 operates in a trick play mode, such as fast forward, system processor 155 accesses trick play metadata in local memory 175 to determine the time position of I frames that are stored in storage device 180. By accessing and decoding only the I frames stored in storage device 180 (in the order of 1.27 seconds, 2.54 seconds, 3.71 seconds, and the like), system processor 155 knows what video data to present to video decoder 165, without having to decode the B and P frames that also reside as part of the stored encoded video data and are unnecessary for a fast forward trick play operation. In, addition system processor 155 can use other stored metadata in the table to support functions such as "jump ahead five minutes" by consulting the time codes of entry points and corresponding byte counts. Also, by consulting the metadata table, system processor 155 can locate all program starts and endings, and present textual detail about the program contents (such as listing the start, ending, and time duration of a program). Other trick play functions and applications may be implemented by those skilled in the art in accordance with the principles of the present invention.

When transmitting trick play metadata as part of a transport stream from transmitting system 10 to receiving system 20, one embodiment of the present invention replaces that transport priority bit (of a ATSC based transport packet) and inserts trick play metadata instead as this bit is not normally used in ATSC (or in DIRECTV streams). The inventor of the preset invention recognizes that the transport header of a transport packet serves as an ideal place to insert trick play metadata because transport packet headers (and therefore the transport priority bit) are not normally encrypted during transmission. Hence, a decoder may make use of trick play metadata without having to support a security subsystem.

Referring back to the use of the transport priority bit as the location of trick play metadata, the bits that are transmitted as transport priority bits can be assembled into bytes, and such bytes can be assembled into complete messages. Multiple messages will then comprise metadata for a particular PID and the elementary stream for which the PID corresponds to.

Although it may seem as if a single of group of bits may not be enough to generate meaningful trick play metadata, the inventor notes that for a 4M bps video stream, more than four thousand packets will be transmitted per second (as compared to 2650 data packets for an ATSC based delivery system). Hence, by using the transport priority bit alone, several hundred bytes of trick play metadata are capable of being received and used by receiver system 20. It is to be appreciated that other parts of a transport packet including other sections of the header, payload, both the header and payload, and other types of transport packets themselves may be used to transmit trick play related metadata, in accordance with the principles of the present invention.

TABLE 2 represents an exemplary embodiment of a message presenting trick play metadata that is assembled from priority bit data that is extracted from a series of data transport packets.

TABLE 2

| Element | Format | Value |
|---|---|---|
| Start Code | bits | '00000000 00000000 00000001' |
| Function | byte | '0000 0001' |
| ByteCount | byte | N = bytes of Payload |
| Payload | N x bytes | Variable |
| Fill | Y x bits | "1" is repeated until the next start code |

TABLE 3 represents an exemplary embodiment of an alternative message presenting trick play metadata that is assembled from priority bit data that is extracted from a series of data transport packets.

TABLE 3

| Element | Format | Value |
|---|---|---|
| Start Code | bits | '00000000 00000000 00000001' |
| Command | byte | As defined by COMMAND in TABLE 5 |
| Data | N x bytes | As defined by DATA in TABLE 5 |
| Fill | Y x bits | '1', repeated Y times, until next start code |

If a received transport packet is lost or is in error during reception, the current metadata message after that point would be suspect, and the further acquisition of messages will stop until a new start code is detected. In an optional embodiment of the present invention, the syntax of a "payload" is constructed so that start code emulation does not have to happen. Specifically, this is accomplished by inserting a marker bit (of value '1') between syntax elements that compose the message. At the end of the data, the value of '1' is repeated until the next start code.

If trick play metadata can be aligned to a transmission a transport header flag such as a Boundary Bundle bit or a Payload Unit Start Indicator (as used for ATSC based transport packets), a transport header flag can then serve as a start indicator for indicating the presence of a metadata message (which can serve as metadata to support a trick play function). Under such a condition, metadata transmissions optionally change to a format as shown in TABLE 4, where data does not have to be constrained in order in avoid the unintended triggering of a start code. Similarly, an indicator flag in the header of a transport packet can be set to indicate the presence of trick play related metadata in the payload of the transport packet.

TABLE 4

| Element | Format | Value |
|---|---|---|
| Function | byte | As defined by COMMAND, as shown in TABLE 5 |
| Payload | N × bytes | As defined by DATA, as shown in TABLE 5 |
| Fill | Y × bits | '1', repeated Y times, until the next message |

Under the specific alignment format, as presented in TABLE 4, a new semantic is inferred that related to the data of specific video frames that are contained within a transport payload. For example, a data-type indicating the "program time code" of a given frame can be assembled from the same transport packets that contain said frame. This type of correspondence can be achieved for a majority, if not all, frames transmitted in a transport multiplex.

The following presents a general structure of COMMAND and DATA fields that may be used to transmit trick play metadata, as used for the transport structures presented in Tables 2-4. It is noted that the generalized COMMAND and DATA commands may be concatenated together and transmitted as a string of multiple commands and data, until the size of ByteCount variable is detected, until "fill" bits are detected, or until the next start code is detected. COMMAND and DATA types are shown in TABLE 5 which may used to describe attributes of video information in a data transport packet.

TABLE 5

| COMMAND | DATA | Meaning of data/associated attributes |
|---|---|---|
| 0000 0000 | | Forbidden |
| 0000 0001 | | Forbidden |
| 0000 XX1X | | Reserved |
| 0000 X1XX | | Reserved |
| 0000 1XXX | | Reserved |
| 0001 0000 | 6 bytes | Value of "time code" at current frame start |
| 0001 0001 | 6 bytes | Value of "time code" at program start |
| 0001 0010 | 6 bytes | Value of "time code" at last discontinuity |
| 0001 0011 | 6 bytes | Value of "time code" at program end |
| 0001 0100 | 6 bytes | Value of current program duration |
| 0001 0101 | 6 bytes | (Maximum) Video Bit Rate |
| 0001 0110 | 6 bytes | Value of current frame size, in bytes |
| 0001 0111 | 6 bytes | Value of current program size, in bytes |
| 0001 1XXX | 6 bytes | Reserved |
| 0010 0000 | 1 byte | Current frame type, defined as follows: 0000 0000 = forbidden 0000 0001 = I frame 0000 0010 = P frame 0000 0011 = B frame 0000 0100 = trick mode key frame 0000 0101 = random access point 0000 0110 = decoding reference frame 0000 0111 = discontinuous frame xxxx 1xxxx = Reserved |
| 0010 0001 | 1 byte | Value of (PTS − DTS)/ (PTS[frame + 1] − PTS [frame]) |
| 0010 0010 | 1 byte | Value of current program number |
| 0010 0011 | 1 byte | Still Frame; number of seconds to display |
| 0010 X1XX | 1 byte | Reserved |
| 0010 1XXX | 1 byte | Reserved |
| 0011 0000 | 8 bytes | Value of pgm byte ptr at start of current frame |
| 0011 0001 | 8 bytes | Value of pgm byte ptr at program start |
| 0011 0010 | 8 bytes | Value of pgm byte ptr at program end |
| 0011 0011 | 8 bytes | Reserved |
| 0011 X1XX | 8 bytes | Reserved |
| 0011 1XXX | 8 bytes | Reserved |
| 0100 0000 | 6 bytes | PTS value of current frame |
| 0100 0001 | 6 bytes | DTS value of current frame |
| 0100 0010 | 6 bytes | PCR value at start of current frame location |
| 0100 0011 | 6 bytes | Value of PCR at start of next discontinuity |
| 0100 X1XX | 6 bytes | Reserved |
| 0100 1XXX | 6 bytes | Reserved |
| 1111 0000 | 1 byte | Number of program description text bytes to follow |
| 1111 0001 | 1 byte | Number of XML data bytes to follow |
| 1111 1111 | | End of payload; used optionally; fill follows |

All other COMMAND values are reserved and are to be followed by one byte of data that described the number of additional data bytes to follow, as an operand to the command.

The use of COMMAND and DATA commands, as presented in TABLE 5 are optional, for example, the absence of an indication of an I frame is not an assertion that the present frame is not an I frame. However, for COMMAND and DATA explicitly asserted in a transport packet, the meaning of such COMMANDS and DATA are true.

Using the methodology described above, a table of metadata is to be constructed at roughly (if not the same) rate in which video frames are received by receiver system 20. For example, if only five minutes of video is captured and stored on storage device 180, trick play metadata for those same five minutes are also stored on storage device 180.

Optionally, in order to use storage device 180, a partial transport stream may be stored where data packets not contributing for a desired program are discarded by receiver system 20. Using such a methodology requires a degree of transport stream decoding by transport decoder 160. During this optional decoding process, trick play metadata can be extracted and stored elsewhere from the partial transport stream. In this way, the storage of a transport stream can be handled by storage device 180 and related storage system components, allowing for further encryption or data reorganization for facilitating the optimal retrieval and playback of video data. The trick play metadata can therefore remain open and local to receiver system 20 for further search processes, where metadata is searched for video parameters rather than the transport stream itself. When the appropriate metadata is found, simple file index commands can be generated for storage subsystems such as storage device 180.

As an additional optional embodiment of the present invention, information related to trick play metadata may be placed into a packetized elementary stream (PES) structure which is inserted into the payload of one or more transport packets of a unique PID. In such a case, the addition of a presentation time stamp (PTS) field is used to identify a single frame to which a given PES packet applies. This optional embodiment of the invention supports transmitting trick play metadata associated with channel guide information or transmitting program specific information (PSI) that identifies a program to which the trick play metadata applies.

Figure 3:
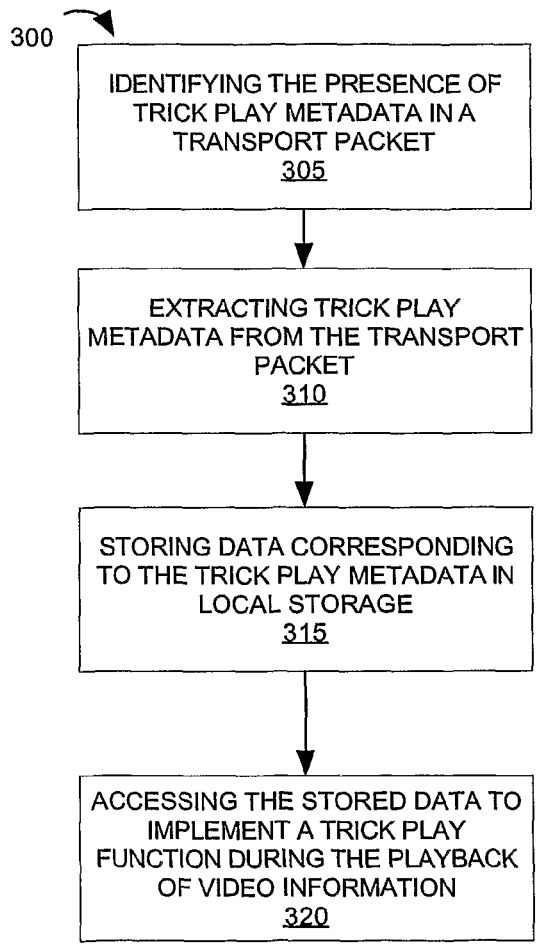
FIG. 3 is a schematic diagram illustrating an exemplary embodiment of a method for extracting trick play metadata from a transport packet to support the enablement of a trick play function.

FIG. 3 illustrates a method 300 for extracting and using trick play metadata from a received transport stream, in accordance with an embodiment of the present invention. Step 305 is an optional step of identifying whether data that can be used as trick play metadata exists within a transport packet. As explained above, information that may be used as trick play metadata may reside in a transport packet header, payload of a transport packet, span multiple transport packets, or a combination of all of these possibilities. Furthermore, the identification of the metadata may be performed by setting aside a certain flag indicating the presence of trick play metadata, by using various commands and data formats (as described above), or by other procedures in accordance with the principles of the present invention.

Step 310 is the extraction of information that may be used as trick play metadata from received transport packets. Typically, transport decoder 160 performs this step, but alternative embodiments of step 310 exist that may be implemented by other components of receiver system 20. For example, a received transport stream may be archived in storage device 180, until a later time where transport decoder 180 parses such a data stream for the presence of information that may be used as trick play metadata. In step 315, the extracted information that represents trick play metadata is stored in a memory such as local memory 175 or storage device 180. Preferably, such metadata information is stored in a table, as described above.

Step 320 provides that if a trick play function is to be activated during video playback, a video playback device (such as receiver device 20) accesses stored data representing trick play metadata, and uses such information to implement a desired trick play function. As described above, if a user were to desire a trick play function of fast forwarding, the video playback device (20) would locate the time positions of I frames stored in storage device 180, and only output such frames during the fast forwarding operation. Other trick play functions are to be implemented by using stored trick play metadata, as in accordance with the principles of the present invention.

It is to be appreciated that while the present invention is described with respect to an Advanced Television Systems Committee (ATSC) based communications system, the present invention may be employed with any packet-based digital communications system.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for transmitting video information in the format of a packetized data stream, said method comprising the steps of:
    formatting video information into a plurality of transport packets;
    inserting trick play metadata into transport headers of said transport packets as to support a trick play function; and transmitting said transport packets; wherein: said trick play metadata describes an attribute of said video information; and said trick play metadata is assembled into bytes representing at least one message used to support said trick play function and is inserted into transport priority bits of said transport headers prior to said transmission of said transport packets, wherein said trick play metadata is extracted from said transport priority bits of said transport packets and re-assembled into said bytes representing said at least one message used to support said trick play function at a receiving device.

2. The method of claim 1, wherein an indicator flag is activated in a transport header of at least one of said transport packets to indicate that said trick play metadata is present in a payload of said at least one of said transport packets.

3. The method of claim 1, wherein at least one of said transport packets contains data representing at least one command, and said at least one command is selected from at least one of: a time code of a current frame, a time code of a program start, a time code of a last discontinuity, a time code of a program end, information related of a current frame size, information related to current program size, information indicating a video frame in said at least one transport packet, a trick mode key frame, a decoding reference frame, a discontinuous frame, and information representing a still frame and the number of seconds said frame is to be displayed.

4. A method for receiving video information in the format of a packetized data stream, said method comprising the steps of:
    processing a plurality of transport packets from said packetized data stream as to extract trick play metadata that corresponds to video information in said transport packets, wherein said trick play metadata is extracted from transport priority bits of said transport packets and re-assembled into bytes representing at least one message used to implement a trick play function at a receiving device; and storing information indicative of said trick play metadata as to support said trick play function.

5. The method of claim 4 comprising the additional steps of: accessing said information indicative of said trick play metadata, and using said information indicative of said trick play metadata to implement said trick play function.

6. The method of claim 4, wherein said stored information is stored in a table.

7. The method of claim 4, comprising the additional step of: storing data from said transport packets in a storage device, wherein said stored data is at least one of: the transport packets, video information decoded from said transport packets, video information that is decoded from said transport packets and is selected in view of the trick play metadata that is extracted from said transport packets.

8. The method of claim 4, wherein said extraction of said trick play metadata is performed in view of an indicator flag indicating the presence of said trick play metadata in said transport packet.

9. The method of claim 4, wherein said extraction step is repeated for a plurality of transport packets as to fill at least one entry in a table of metadata.

* * * * *